April 21, 1959     P. NOGIER ET AL     2,882,899
INJECTION SYRINGE AND PISTON
Filed July 6, 1955
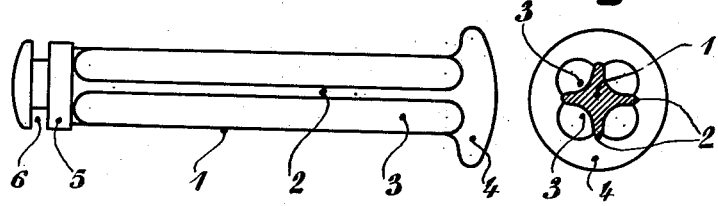
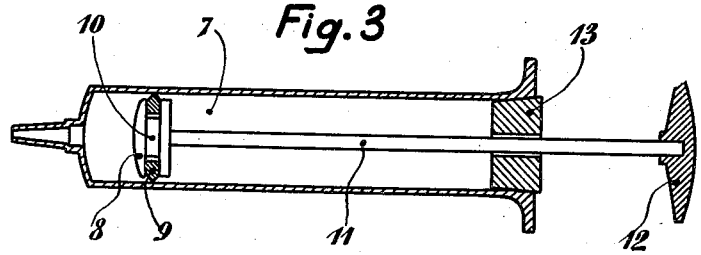
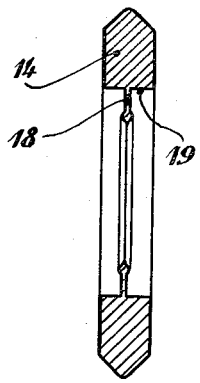
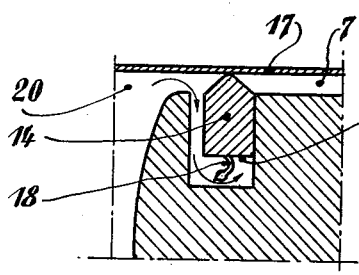
INVENTORS,
PAUL NOGIER,
LOUIS NOGIER
by:
Michael S. Striker
agt.

United States Patent Office
2,882,899
Patented Apr. 21, 1959

2,882,899

INJECTION SYRINGE AND PISTON

Paul Nogier and Louis Nogier, Lyon, France

Application July 6, 1955, Serial No. 520,289

5 Claims. (Cl. 128—218)

The invention relates to injection syringes and pistons therefor.

It is one object of the invention to provide a piston for an injection syringe, comprising an elongated body having a plurality of radial fins forming between them grooves running parallel to the longitudinal axis of said body, an enlarged part at one end of said body forming a push-button for operating the piston in a cylinder and a part of circular cross-section at the other end of said body, formed with a circumferential recess adapted to receive a flexible annular washer.

It is another object of the invention to provide an injection syringe comprising a cylinder and a piston adapted to slide in said cylinder, said cylinder having a flared opening at one end, said piston including a rod projecting from said opening and a part at the projecting end of said rod providing a push-button for operating said piston, a part of circular cross-section at the other end of said rod, formed with a circumferential recess, a washer having a central hole received in and projecting from said recess and a plug formed with a central hole and engaged in said opening, said rod passing through said hole and being guided by the latter for longitudinal sliding movement.

It is a further object of the invention to provide a syringe comprising a cylinder, a piston adapted to slide in said cylinder, said piston being formed with a circumferential recess, and a washer which has a central hole and which is received in said recess, the longitudinal thickness of said washer being, over a part of its depth, slightly less than the width of said recess and said washer having an inwardly extending flexible annular part of reduced width surrounding said hole and adapted to make contact with the bottom of said recess when said piston is at rest and to be deformed when said piston is operated.

It is yet another object of the invention to provide a syringe comprising a cylinder, a piston adapted to slide in said cylinder and having an elongated body having a plurality of radial fins forming between them grooves running parallel to the longitudinal axis of said body, an enlarged part at one end of said body forming a push-button for operating said piston and a part of circular cross-section at the other end of said body, formed with a circumferential recess and a washer having a central hole received in and projecting from said recess, the longitudinal thickness of said washer being, over a part of its radial depth, slightly less than the width of said recess and said washer having a flexible annular part of reduced width surrounding said hole and adapted to make contact with the bottom of said recess when said piston is at rest and to be deformed when said piston is operated.

The invention will now be more fully described with reference to the accompanying drawings.

In the drawings:

Figure 1 shows a piston for an injection syringe;

Figure 2 is a cross-sectional view of the piston shown in Figure 1;

Figure 3 shows one form of injection syringe constructed in accordance with the invention;

Figure 4 is a fragmentary sectional view of another form of injection syringe constructed in accordance with the invention;

Figure 5 is a sectional view of a washer which forms a part of the syringe of Figure 4 and Figure 6 is a view similar to Figure 4, but showing the washer in a displaced position.

Referring now to Figures 1 and 2, a piston for an injection syringe comprises an elongated body 1 which is moulded from a so-called "plastic" material. The body 1 is moulded so as to have four fins 2 which form between them grooves 3 running parallel to the longitudinal axis of the body. At their ends the fins 2 are enlarged to meet one another and thus provide, at one end of the body 1, an enlarged part forming a push-button 4 for operating the piston in the cylinder of a syringe and, at the other end of the body a cylindrical part 5 formed with a circumferential groove or recess 6 adapted to receive a fluid-tight washer.

This arrangement prevents the piston from floating or moving about loosely during the course of sterilisation and thus prevents water entering the interior of the piston. Furthermore, it simplifies manufacture by replacing two parts by one and permits a substantial saving in weight having regard to the rather heavy pistons in use hitherto. Furthermore, the grooves 3 may be used for housing needles when the syringe is carried about.

Hitherto pistons for injection syringes have usually been transparent. It is preferred to mould the piston of Figures 1 and 2 from an opaque plastic material. Such a material may be white or it may be coloured in a pale shade.

The use of an opaque piston strengthens the impression of transparency of the body of the syringe and facilitates reading the graduation by increasing the contrast. Furthermore, colouring of the piston allows waste material produced during the moulding of the body of the syringe to be used in the moulding of the piston. This is because the use of a colouring agent masks the prejudicial yellowing which usually arises when plastic materials are re-moulded. Likewise, it reduces the number of pistons which have to be rejected during manufacture since it renders invisible internal defects which, without altering the operation of the piston, would nevertheless be disadvantageous from a commercial point of view.

Referring now to Figure 3 there is mounted in the syringe body or cylinder 7 a metallic piston including a cylindrical part 8 formed with a circumferential groove or recess 10 which receives a washer 9. The part 8 is mounted at one end of a rod 11 which is terminated by a push button 12 for operating the piston. A frusto-conical plug 13 is a tight push-fit in a conical opening of the cylinder 7 and ensures good guiding of the rod 11. The plug also serves to prevent the piston being withdrawn from the cylinder during use by engaging the part 8 at the end of its travel. While this piston has many of the advantages of that shown in Figures 1 and 2 it does not become yellow after repeated sterilisation and its robustness ensures that it has a long life. After prolonged use in one cylinder it can be provided with a new washer and transferred to a new plastic cylinder.

Figures 4, 5 and 6 show a syringe which includes a washer of an improved type. It is desirable that the washer of a syringe should offer little resistance to sliding, while at the same time providing a good fluid-tight seal between the piston and the cylinder. However, washers in use hitherto either have offered little resistance to sliding but have had a slightly defective fluid-tightness at low pressures or, on the other hand, have provided a good fluid-tight seal but have not been capable of a smooth sliding movement. The washer included in the syringe of Figures 4, 5 and 6, is an improvement in these respects.

Referring to Figures 4 and 5, the syringe includes a piston 16 formed with a circumferential recess or groove 15. A washer 14 is engaged in the groove 15 and is capable of being displaced easily and freely in the groove both in the radial and longitudinal directions. The washer is flexible and thus continuous contact between its outer profile and the wall 17 of the cylinder 7 is ensured.

Over the greater part of its radial depth the thickness of the washer is only slightly less than the longitudinal width of the groove 15. However, the washer has a part of reduced thickness which provides an inwardly extending flexible annular flange 18 surrounding the central hole of the washer. The flange 18 is formed with an enlarged portion around its inner edge, as best shown in Figure 5. The flange 18 thus makes a good resilient contact with one of the bottom walls of the recess in a resilient manner so that, when the piston is at rest, liquid cannot pass the washer while, when pressure is applied to the piston, the part 18 is deformed and the hydraulic pressure is transmitted to the whole of the face 19 on both sides of the flange 18, as shown in Figure 6.

Figure 4 shows that, in the position of rest, liquid cannot pass the washer since the flexible part 18 presses resiliently against the bottom of the recess 15 in a continuous manner. On the other hand, referring to Figure 6, at the instant at which pressure is applied the thick part of the washer is pressed against one of the side walls of the recess 15 and the flexible part 18 is deformed so that the pressure in the forward chamber 20 is transmitted to the whole of the surface 19. This leads to the thick part of the washer being pressed against the cylinder wall 17 with a pressure proportional to the hydraulic force which the washer has to support. It is thus able to resist the application of pressure in a very effective manner.

We claim:

1. An injection syringe comprising a cylinder; a piston adapted to slide in said cylinder, said cylinder having a flared opening at one end, said piston including a rod projecting from said opening and a part at the projecting end of said rod providing a push-button for operating said piston, a part of circular cross-section at the other end of said rod, formed with a circumferential recess; a washer having a central hole received in and projecting from said recess, the maximal thickness of said washer being slightly less than the width of said recess and said washer having an inwardly extending flexible annular part of reduced width surrounding said hole and adapted to make contact with the bottom of said recess when said piston is at rest and to be deformed when said piston is operated so as to be out of contact with the bottom of said recess, and a plug formed with a central hole and engaged in said opening, said rod passing through said hole and being guided by the latter for longitudinal sliding movement.

2. A syringe as claimed in claim 1, wherein said plug is frusto-conical in shape and is a tight push-fit in said opening.

3. A syringe as claimed in claim 1, wherein said rod and said part of circular cross-section are formed of metal.

4. A syringe comprising a cylinder, a piston adapted to slide in said cylinder, said piston being formed with a circumferential recess, and a washer which has a central hole and which is received in said recess, the maximal thickness of said washer being slightly less than the width of said recess and said washer having an inwardly extending flexible annular part of reduced width surrounding said hole and adapted to make contact with the bottom of said recess when said piston is at rest and to be deformed when said piston is operated so as to be out of contact with the bottom of said recess.

5. A syringe as claimed in claim 4, wherein said part of reduced width is formed with an enlarged portion around its inner edge.

References Cited in the file of this patent

UNITED STATES PATENTS

| 1,115,561 | Northey | Nov. 3, 1914 |
| 2,629,376 | Gallice et al. | Feb. 24, 1953 |
| 2,695,612 | Fields | Nov. 30, 1954 |
| 2,742,041 | Lipari | Apr. 17, 1956 |
| 2,766,754 | Hill | Oct. 16, 1956 |

FOREIGN PATENTS

| 1,048,267 | France | Aug. 5, 1953 |
| 1,053,583 | France | Sept. 30, 1953 |